United States Patent [19]
Untermyer

[11] 3,786,256
[45] Jan. 15, 1974

[54] METHOD AND APPARATUS FOR NUCLEAR FUEL ASSAY WITH A NEUTRON SOURCE AND COINCIDENT FISSION NEUTRON DETECTORS

[75] Inventor: Samuel Untermyer, Portola Valley, Calif.

[73] Assignee: National Nuclear Corporation, Palo Alto, Calif.

[22] Filed: Nov. 18, 1971

[21] Appl. No.: 199,902

Related U.S. Application Data

[63] Continuation-in-part of Ser. No. 56,386, July 20, 1970.

[52] U.S. Cl. .............................. 250/71.5 R, 250/83.1
[51] Int. Cl............................ G01t 1/20, G01t 3/00
[58] Field of Search................... 250/71.5 R, 71.5 S, 250/83.1, 83.3 R; 313/61 D

[56] References Cited
UNITED STATES PATENTS 3,222,521 12/1965 Einfeld................................ 250/83.1
3,573,458 4/1971 Anger............................ 250/71.5 S
2,830,185 4/1958 Scherbatskoy.................. 250/71.5 R Primary Examiner—James W. Lawrence
Assistant Examiner—Davis L. Willis
Attorney—Flehr, Hohback, Test, Allbritton & Herbert

[57] ABSTRACT

A method and apparatus for the non-destructive assay of nuclear reactor fuels. Neutron irradiation of the fuel emits fission neutrons and gammas in groups of two to three neutrons and about five gammas for each fission and these neutrons and gammas are detected in a coincident counting system to obtain a quantitative assay of the fissionable species in the fuel. The proportions of various fissile isotopes in a fuel sample are also detected by coincident counting at a plurality of coincidence levels.

15 Claims, 6 Drawing Figures

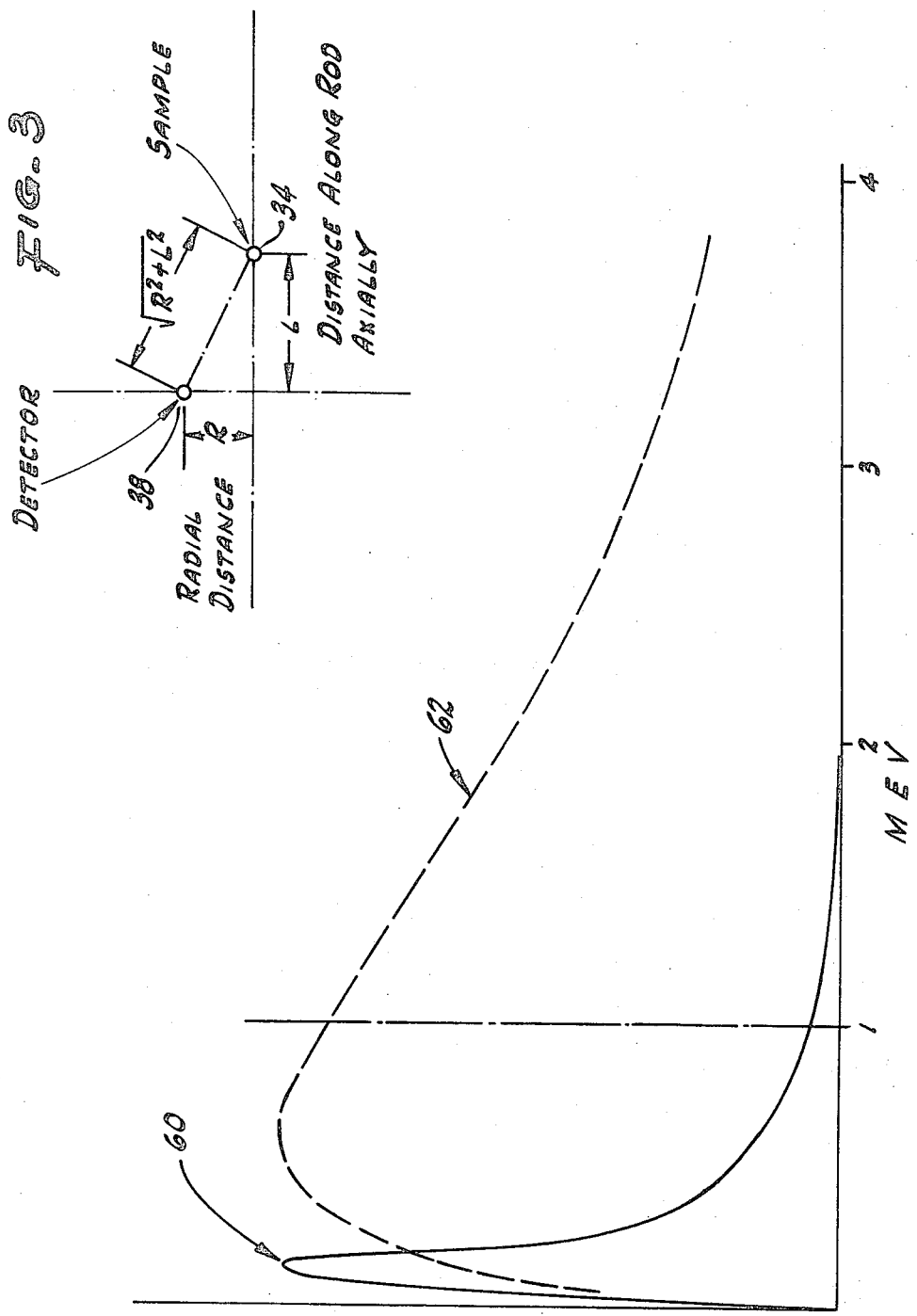

METHOD AND APPARATUS FOR NUCLEAR FUEL ASSAY WITH A NEUTRON SOURCE AND COINCIDENT FISSION NEUTRON DETECTORS

CROSS-REFERENCE TO RELATED APPLICATIONS

This is a continuation-in-part of abandoned application Ser. No. 56,386, filed July 20, 1970, entitled METHOD AND APPARATUS FOR NUCLEAR FUEL ASSAY WITH A NEUTRON SOURCE AND COINCIDENT FISSION NEUTRON DETECTORS.

Reference is also made to copending applications Ser. No. 728,463 filed May 13, 1968, entitled METHOD FOR THE NON-DESTRUCTIVE ASSAY OF BULK NUCLEAR REACTOR FUEL AND APPARATUS and Ser. No. 854,907 filed Sept. 3, 1969 entitled SOURCE OF LOW ENERGY NEUTRONS.

BACKGROUND OF THE INVENTION

This invention relates to the non-destructive assay of nuclear reactor fuel.

In my copending application Ser. No. 728,463 a system for assaying bulk nuclear fuel was disclosed in which the fuel was irradiated with neutrons of an energy level lower than at least some of the fission neutrons while simultaneously measuring the emission of fast fission neutrons. In this copending application two methods were disclosed to distinguish between fission and source neutrons; either by energy discrimination or by shielding the source neutrons from the detector.

Another method of discriminating against source neutrons is disclosed in the Keepin Pat. No. 3,456,113 issued July 15, 1969. In this patent delayed neutrons from the sample are counted during periods when the neutron source is turned off, thus providing time discrimination.

The previous fuel assay methods have not been entirely satisfactory as a result of losses in detection efficiency and spatial resolution resulting from low delayed neutron yield in the case of the Keeping patent, and the loss in efficiency arising from the requirement to discriminate against low energy neutrons in the method of the copending application. Both methods require small counters to obtain spatial resolution which further comprises efficiency. The copending application is limited to fast neutron counters in order to obtain discrimination, and such counters are sensitive to gammas so that heavy shielding is required when assaying spent fuel. Accordingly, the need has been recognized for a bulk nuclear fuel assay system which discriminates against source neutrons while allowing the use of gamma-insensitive proportional counters in coincidence to obtain very low gamma count rate with minimal shielding.

In U.S. Pat. No. 3,018,374 entitled METHODS OF AND MEANS FOR ASSAYING MATERIAL HAVING A FISSIONABLE COMPONENT, which is assigned to the assignee of the present invention, there is disclosed an improved method and apparatus for assaying fissionable material in which a fission event is counted only if neutrons are simultaneously detected by two spatially separated detectors. In this manner some discrimination is achieved over background or unwanted radiation.

SUMMARY OF THE INVENTION AND OBJECTS

A general object of the present invention is to provide an improved method and apparatus for the non-destructive quantitative assay of nuclear reactor fuel for fissionable species.

Another object is to provide a method and apparatus of the type described which is capable of utilizing the lower energy fission neutrons emitted in connection with prompt neutron interrogation of nuclear fuel.

Another object is to provide method and apparatus of the type described for assaying localized regions in a fuel rod.

Another object is to provide method and apparatus of the type described for assaying nuclear fuel in the presence of intense radiation fields.

Another object is to provide a method and apparatus for determining the proportions of various fissile isotopes in a fuel sample.

Another object is to provide a method and apparatus for determining the proportions of neutron-emitting isotopes to fissile isotopes in fresh or irradiated reactor fuel or other fissile materials.

The foregoing and other objects and advantages of the present invention are provided by the method and apparatus in which a sample of nuclear fuel is irradiated by an interrogating beam of source neutrons and the fission neutrons or gammas emitted by the fuel are counted in two or more coincident counting channels using the count rate of coincidental events as an indication of the fissile content of the fuel sample.

Additional objects and features of the invention will appear from the following description in which the preferred embodiments of the invention have been set forth in detail in conjunction with the drawings.

BRIEF DESCRIPTION OF THE DRAWINGS

FIG. 3 is a schematic illustration of the spatial relationship between the sample element in the fuel rod and a single detector;

FIG. 5 is a graph showing the overlap between the neutron spectra fo source neutrons and fission neutrons.

DESCRIPTION OF THE PREFERRED EMBODIMENTS

Figure 1:
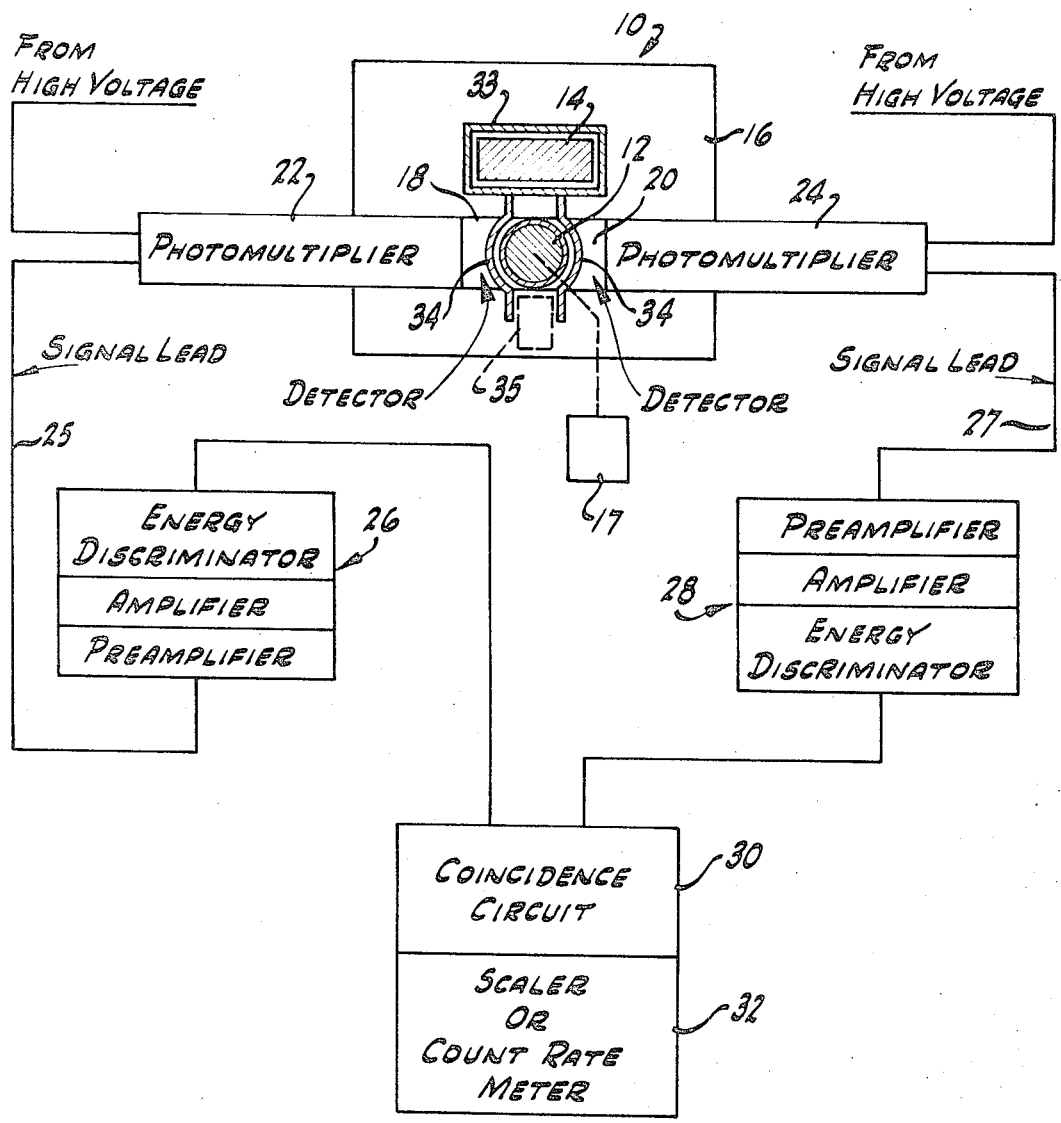
FIG. 1 is a schematic view of a fuel assay system incorporating features of the invention.

In the drawings FIG. 1 illustrates in schematic form nuclear fuel assay apparatus 10 for assaying the fissile content of a fuel rod 12 in accordance with the present invention. Assay apparatus 10 includes a neutron source 14 mounted within a supporting medium 16 in spaced relationship with fuel rod 12. The fuel rod is illustrated in end view and is mounted for insertion and removal within the supporting medium, and a suitable advancing mechanism 17 is provided to axially index the fuel rod for assaying the entire rod. Supporting medium 16 may comprise a moderator material such as wax or paraffin, a scatterer, such as iron, or a substantially empty structure or shell.

A pair of radiation or neutron detectors 18, 20 are mounted within the supporting medium preferably at diametral positions around the fuel rod to receive fission neutrons or neutron induced gammas emitted from the rod upon irradiation by an interrogating beam from neutron source 14.

The detectors could also be arrayed around the rod in other angular relationships than that illustrated, as for example, along 90° radii from the rod axis. It is desirable that the detectors not be in common alignment with either the path of source neutrons, or the path of a single fission neutron from the fuel which otherwise could give a false count. For improved counting efficiency the detectors should encompass the greatest possible solid angle surrounding the rod segment being assayed, and be in close spaced relationship thereto as compared to the distance of the source from the rod.

Radiation detectors 18, 20 preferably are organic scintillators which generate photons produced by recoil protons triggered by fast neutrons radiating from the fission events in the fuel, and would be suitable gamma sensitive detectors where gamma emission is to be measured. Detectors 18, 20 are connected with respective photomultiplier tubes 22, 24 which in turn are connected through signal leads 25, 27 to respective preamplifier, amplifier and energy discriminator units 26, 28. The outputs from units 26, 28 are directed into a coincidence circuit 30 which in turn provides a coincidence count into a suitable scaler, count rate meter, or other recording device 32.

Neutron source 14 radiates neutrons one at a time and thus cannot trigger a false count, which otherwise could occur should the source radiate two or more neutrons simultaneously into the two detectors. Preferably the source would comprise a ($\alpha$, $n$) reaction. For example, one of the mixtures of alpha emitters and LiH as disclosed in copending application Ser. No. 854,907 provides this reaction and can advantageously be used as source 14. A gamma shield 33 encloses source 14 to shield the detectors from any gammas emitted from the source.

Neutrons from source 14 with or without moderation or scattering in supporting medium 16 irradiate fuel rod 12 causing fissions in the fissile material, such as U–235, Pu–239 and Pu–241. Each of the fission events releases more than one neutron and more than one gamma during a very short time period of less than one nanosecond. These neutrons and gammas are emitted in random directions and when one neutron or gamma is detected by either of the detectors 18, 20 and electrical signal generated by a respective photomultiplier 22, 24 travels through its associated signal lead into the respective preamplifiers and amplifiers which amplify the signals and feed the same into their associated energy discriminator. The energy discriminators respond to these signals above a predetermined threshold energy level to feed output signal into the coincident circuit 30. This energy is selected to discriminate against low energy gammas from the source and fuel sample. The coincident circuit triggers recording device 32 responsive to receiving simultaneous output signals from both energy discriminators, and the recording device provides an indication or record of the fissile content of the fuel. During operation of the apparatus in detecting and counting radiation fuel rod 12 may be advanced continuously by indexing mechanism 17 to provide a continuous record of the fissile content of local portions of the fuel as it passes between the detectors.

In certain cases the source produces many high energy gammas some of which penetrate the source shield 33. Gammas are scattered near the detectors by effects such as Compton scattering which produce two lower energy gammas each of which may be detected in one of the detectors, resulting in a false coincident neutron count. This background due to locally scattered gammas can be reduced or obviated by either shielding the detectors from each other or by using a triple coincidence counting method. To shield the detector a pair of heavy metal shields 34, preferably of lead, are interposed between respective detectors 18, 20 and the fuel rod. These shields tend to absorb low energy scattered gammas without absorbing many high energy fission gammas which are to be counted. The triple coincidence counting method employs a third detector shown schematically at 35. Suitable photomultiplier, preamplifier, amplifier and energy discriminator units, not shown, are provided for connection with coincident circuit 30 adapted to trigger recording device 32 responsive to simultaneous output signals from all three energy discriminators. This method counts triple coincidences of gammas or neutrons emitted by fission in the fuel, as compared to the previously described double coincidence. Since Compton scattering produces only two gammas, triple coincidence counting materially reduces the gamma background, although at some expense in counting efficiency. For best results all three counters should be shielded from each other using shields 34.

The coincident counting method of the present invention provides excellent discrimination against source neutrons and source gamma rays because source neutrons and gammas from $\alpha$, $n$ sources are emitted one at a time while fission neutrons and neutron induced gammas are emitted from the fuel sample in groups of two or more neutrons or gammas. Thus, there is no chance of counting two events originating at the source in coincidence, while there is relatively high probability of counting two fission neutrons or fission gammas from the sample in coincidence. Furthermore, even if source radiation should be emitted in two or more events, as might occur with a Californium fission neutron source, the distance from the source to the detectors makes it improbable that two events from the source would be counted. The close proximity of the sample to the detectors results in the counting of many fission neutrons and fission gammas.

While it might be expected that the efficiency of a coincident detection system would be lower because the overall efficiency is a product of the efficiency of each counter, in practice the counters can be made with an efficiency of about 30 percent in each detector with this loss in efficiency recovered because the superior spatial discrimination of the coincident system provides adequate spatial discrimination with larger counters, while at the same time lower energy fission neutrons can be counted since energy or time discrimination is not required to distinguish between source and fission neutrons. Moreover, it is not necessary to discard neutron counts for discriminating against gammas, as would be required when high efficiency organic scintillators are used with pulse shaped discrimination as described in copending application Ser. No. 728,463. Also, the use of zinc sulfide organic phosphors in the method of said copending application limits detector thickness and efficiency to far lower values.

Figure 2:
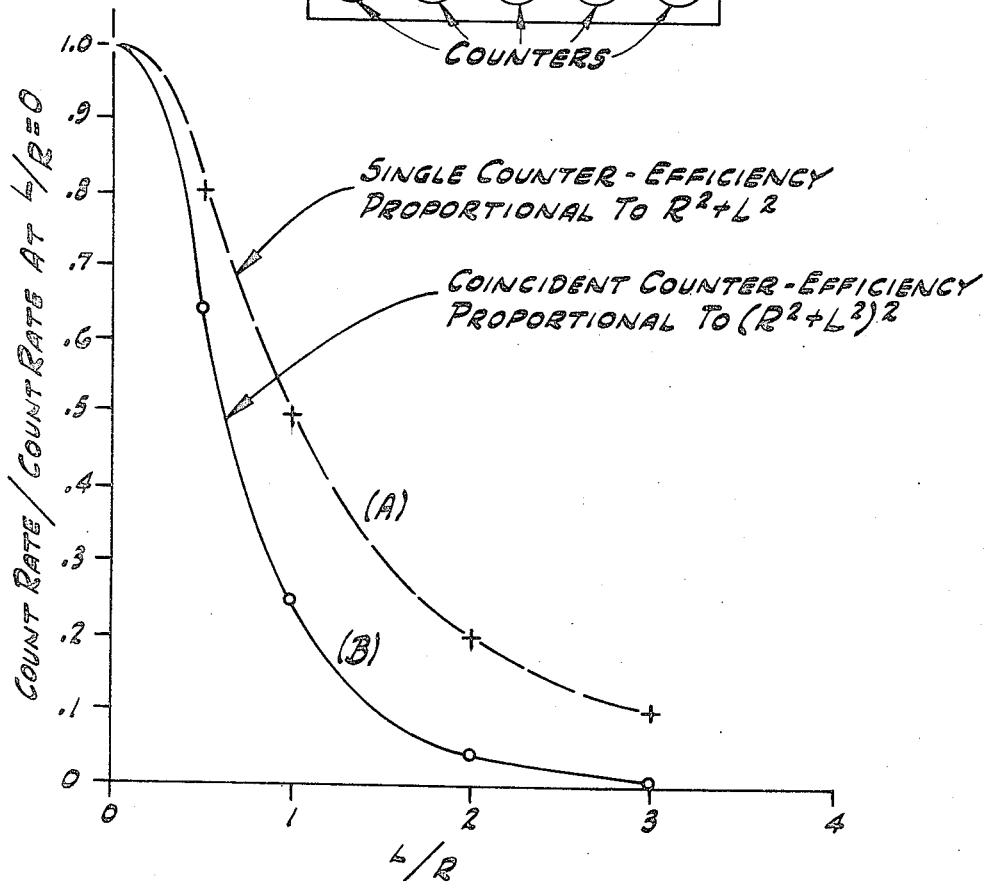
FIG. 2 is a graph illustrating the improvement in spatial resolution with the assay system of the invention.

The improvement in the assay of localized portions of a fuel rod is graphically shown in FIG. 2 where a single counter (curve A) is compared with a coincidence counter (curve B). FIG. 3 illustrates in schematic form the spatial relationship of a given sample portion 34 of an exemplary fuel rod, and a detector or detectors 38 positioned a radial distance R from the fuel rod. Fuel sample 34 is located a distance L along the rod from a plane normal to the rod and passing through the detectors. The distance between the sample and detector or detectors is $\sqrt{R^2+L^2}$. Using a single counter the influence of the sample depends upon the efficiency of the counter for this sample, which in turn is proportional to the inverse square of the distance from the sample to the counter, neglecting for purposes of simplicity a possible attenuation in the surrounding medium. As the fuel rod and sample are moved a given axial distance during irradiation by the interrogating neutron beam the effect of the fissions in the sample portion on the counter falls off in the relationship: $1/(R^2 + L^2)$, as illustrated by curve A.

Using coincident detectors in the manner of the present invention the overall efficiency is the product of the efficiency of each detector so that the counts vary in the relationship: $[1/(R^2 + L^2)]^2$, as illustrated by curve B. A comparison of the two curves demonstrates that the coincident counting system results in materially improved axial discrimination.

Figure 4:
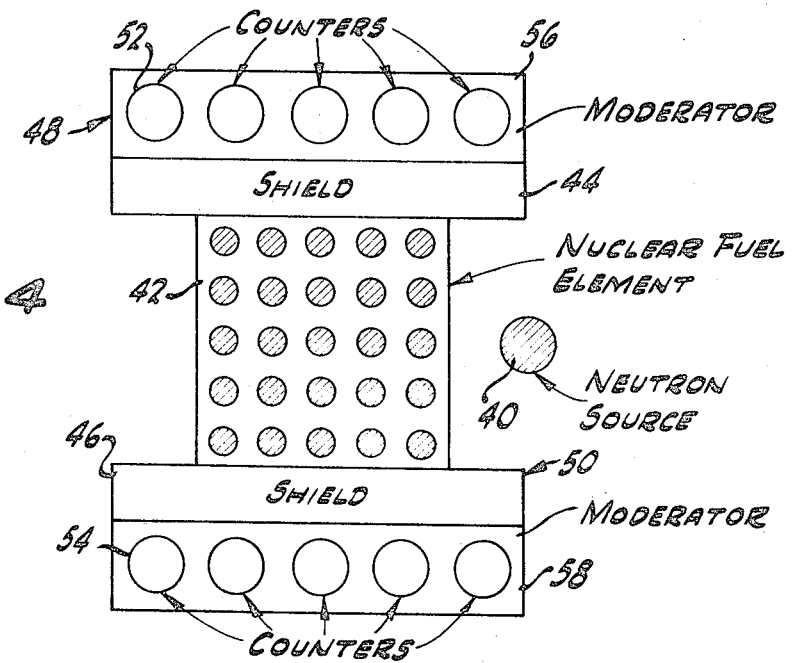
FIG. 4 is a schematic view of another preferred embodiment utilizing moderated neutron counters and especially suitable for assaying irradiated fuels.

FIG. 4 illustrates another preferred embodiment of the invention for assaying highly radioactive fuel. A neutron source 40 is mounted to direct an interrogating beam of neutrons into a structure 42 containing the nuclear fuel sample to be assayed. A pair of gamma shields 44, 46 are mounted on either side of the fuel sample structure, and two arrays of coincident counters 48, 50 are mounted on either side of the shields. The counters are thus shielded from gammas radiating from both the source and fuel sample. The counters each include thermal neutron counters or detectors 52, 54 mounted in groups of three or four within suitable neutron moderator material 56, 58. These thermal neutron detectors can be $BF_3$ or He-3 proportional counters feeding into a coincident counting circuit of the type described above. The neutron sensititve proportional counters obtain a very low gamma count rate with minimal shielding.

FIG. 5 is a graph illustrating fission and source neutron spectra with curve 60 depicting neutron emissions from an exemplary source of the type disclosed in my copending application Ser. No. 854,907. Curve 62 depicts fission neutron emission. The graph illustrates that fission neutrons below about one Mev, which would be the neutron discrimination setting in the method of copending application Ser. No. 728,468, must be discarded to distinguish between source and fission neutrons. This requirement reduces the efficiency of such a method. In the coincidence counting system of the present invention a discrimination of this type is not required thereby improving the efficiency of the counting operation.

An example of the use and operation of the invention is as follows. The sample fuel was an enriched uranium fuel rod. The neutron source was a $2 \times 10^6$ N/S source as described in copending application Ser. No. 854,907. This souce was surrounded by a moderator of paraffin having a two inch minimum thickness, and the source was shielded from the detectors by a two inch layer of lead. The detectors were a pair of NE-102 organic scintillator blocks placed against a pair of RCA-6810-A photomultiplier tubes shielded from external light. The output of each photomultiplier was directed to the inputs of a Canberra Model 1441 fast coincident module, which in turn was connected to the input of Canberra Model 895 scaler. Assay of the fuel rod was carried out thorugh coincident counting of fission radiation at an estimated 10 nanosecond resolution and 10 nanosecond coincidence.

Figure 6:
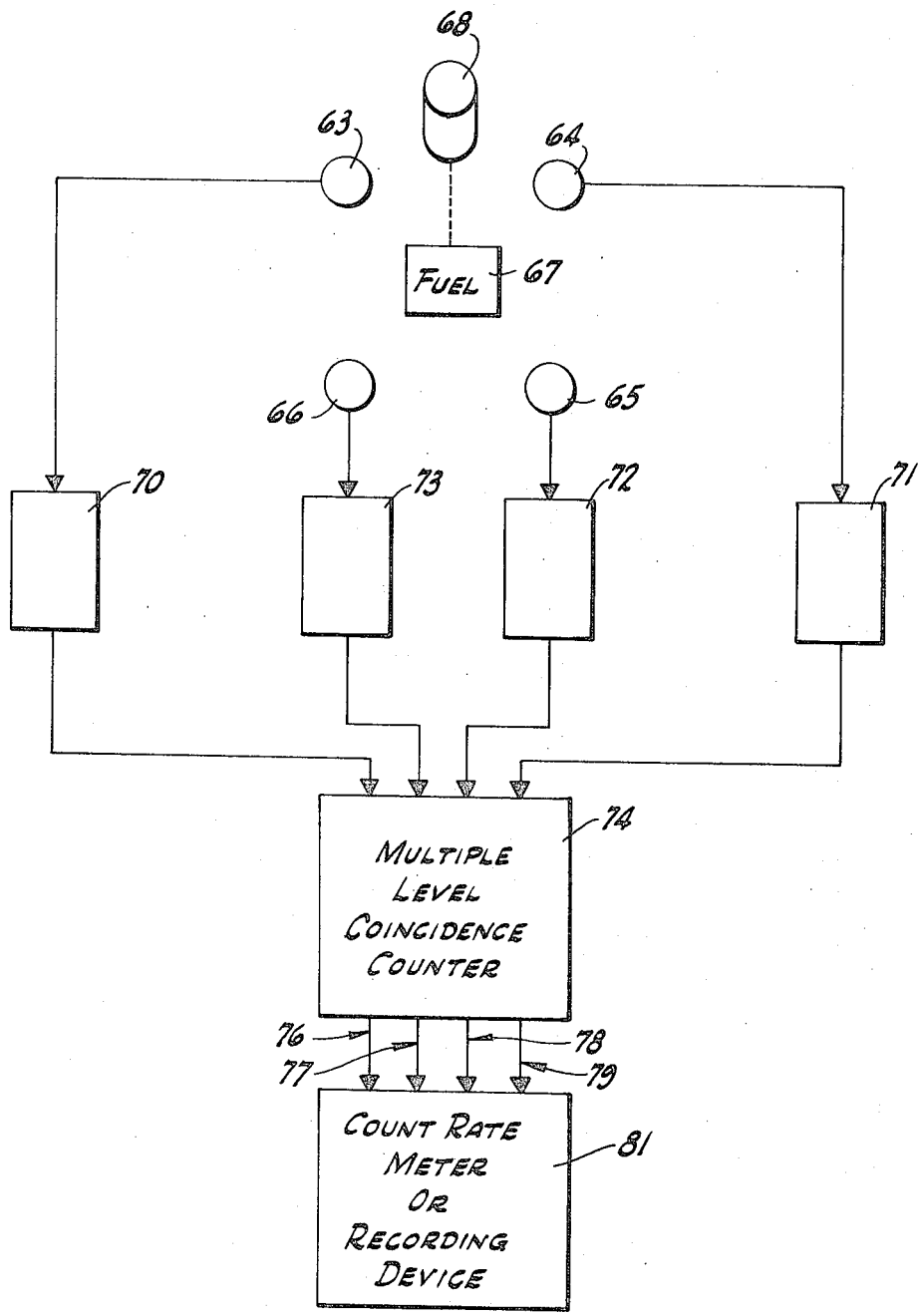
FIG. 6 is a schematic illustration of another embodiment of the invention for determining proportions of individual fissile isotopes in a mixture.

Coincidence counting using a neutron source can also be used to identify and measure the relative abundance of individual fissile isotopes in a mixture of two or three or more isotopes within reactor fuel or other fissile material. This method depends upon the yield of neutrons per fission for each isotope and particularly on the varying probabilities of a fission event in a particular isotope emitting one, two, three or four coincident neutrons. FIG. 6 shows in diagramatic form a coincidence counting arrangement suitable for multiple level coincidence counting for determining proportions of individual fissile isotopes in a mixture. Four separate neutron counters numbered 63 through 66 inclusive are symmetrically disposed with respect to a fuel element 67. A neutron source 68 is provided for supplying an interrogating beam of neutrons to the fuel element 67. These elements are shown only in schematic form in FIG. 6 but it is to be understood that they are of the same general construction as the elements shown and described with reference to FIGS. 1 or 4. Each of the detectors 63 through 66 thus include, for example, photomultiplier tubes and are connectd, respectively, to electronic units 70 through 73 inclusive. Each of the electronic units 70 through 73 can be of the form shown and described with reference to FIG. 1 and contain preamplifier, amplifier and energy discriminator circuitry.

The outputs from the electronic units 70 through 73 are fed into a multiple level coincidence counter 74. This counter 74 measures count rates proportional to the number of single, double, triple or quadruple neutron coincidences. Thus the multiple level coincidence counter 74 has four outputs labeled 76 through 79 inclusive which are fed into a count rate meter or recording device 81. The pulses or signals on output 76 are representative of the number of single neutron or gamma counts recorded by any of the detectors 63 through 66; the pulses or signals on output 77 are representative of the number of coincident double counts recorded by any two of the detectors 63 through 66; the pulses or signals on output 78 are representative of the number of coincident triple counts recorded by any three of the detectors; and the pulses or signals on output 79 are representative of the number of coincidence quadruple counts recorded by the detectors 63 through 66. The count rate meter or recording device 81 can be any suitable device for indicating the respective numbers of single, double, triple and quadruple coincidences.

Determination of the proportions of various fissile materials in a sample depends upon a knowledge of the distribution function for emission of neutrons in fission by the various isotopes. Such distribution functions are well known and are available in various handbooks, for example. The table below gives the distribution function for $U^{233}$, $U^{235}$ and $Pu^{239}$.

Probability of emission of stated number of neutrons per fission

| No. of neutrons | $U^{233}$ | $U^{235}$ | $Pu^{239}$ |
|---|---|---|---|
| 1 | 0.151 | 0.158 | 0.11 |
| 2 | 0.326 | 0.339 | 0.13 |
| 3 | 0.301 | 0.305 | 0.56 |
| 4 | 0.176 | 0.133 | 0.11 |
| 5 | 0.042 | 0.038 | 0.06 |

From the table shown above, it is possible to calculate, as an example, the ratio of single, double, triple and quadruple coincidences of $Pu^{239}$ as compared to $U^{235}$. This calculation considers all neutron emission probabilities that result in more than the number of neutrons required for a given coincidence.

Thus, for example, the probability ratio for single neutron emission is given by $Pu^{239}/U^{235} = [0.11(1) + 0.13(2) + 0.56(3) + 0.11(4) + 0.06(5)]/[0.16(1) + 0.34(2) + 0.30(3) + 13(4) + 0.04(5)] = 1.26$ Similar calculations yield probability ratios of 1.29 for double coincidence, 1.68 for triple coincidence and 1.47 for quadruple coincidence between the two isotopes. Since the probability ratio varies among the multiple levels of coincidence, the proportions of the isotopes in an unknown mixture can be determined by measuring the count rates at multiple coincidence levels.

For purposes of illustration, consider a sample of $U^{235}$ giving 1,000 counts per second with double coincidence, 200 counts per second for triple coincidence, 40 counts per second for quadruple coincidence, and 10 counts per second for five-fold coincidence. The following table indicates count rates for this sample of $U^{235}$, as well as for a sample of $Pu^{239}$ having the same count rate at double coincidence, and also for a mixture of equal parts of these two materials.

| Coincidence Level | Counts per second | | |
|---|---|---|---|
|  | $U^{235}$ | 50 % $U^{235}$ 50 % $Pu^{239}$ | $Pu^{239}$ |
| 2 | 1000 | 1000 | 1000 |
| 3 | 200 | 203 | 206 |
| 4 | 40 | 47 | 53 |
| 5 | 10 | 11 | 12 |

Thus it is possible to detect $Pu^{239}$ in $U^{235}$ bearing materials by measuring neutron emission at two coincidence levels, for instance with double and quadruple coincidence. By interpolation and comparison with standards, the proportion of $Pu^{239}$ in the mixture can be determined.

Similarly, the gamma plus neutron multiplicity or coincident emission at various levels of coincidence varies between various isotopes so that measurement can be made of both gamma and neutron emission to determine the proportions of different isotopes.

The apparatus and method of this inveniton may also be used in a passive mode, without a neutron source, to measure the emission of coincident neutrons or gammas from certain isotopes such as $Pu^{240}$, $Cm^{242}$ or $Cm^{244}$. By comparison of the measurements of the emission rates at various levels of coincidence, the proportions of the various isotopes in a mixture can be determined.

Analysis of the proportions of various isotopes in a mixture can also be made using a combination of the active and passive techniques. That is, the same sample can be analysed both actively and passively to determine the proportions of spontaneous neutron emitters or compared to fissile isotopes, which do not emit substantial numbers of spontaneous neutrons.

While the embodiments herein are at present considered to be preferred, it is understood that numerous variations and modifications may be made therein by those skilled in the art and it is intended to cover in the appended claims all such variations and modifications as fall within the true spirit and scope of the invention.

I claim:

1. A method for the non-destructive assay of a nuclear fuel sample comprising the steps of generating source neutrons one at a time for interrogating the sample, irradiating the sample with the source neutrons to fission the fissile elements in the sample for emission of fission neutrons or fission induced gammas in groups of more than two neutrons or gammas, and counting the emitted groups of more than two neutrons or gammas in coincidence to provide a coincident event count rate as an indication of the fissile content of the sample.

2. The method of claim 1 in which the fuel sample comprises an enlogate fuel rod and the step of irradiating the fuel sample includes advancing the fuel rod in an axial direction, and the step of counting the fission neutrons or gammas is carried out continuously as the rod is advanced to establish a continuous record of the fissile content of local portions of the rod.

3. A method for the non-destructive assay of a nuclear fuel rod by means of three fission neutron detectors comprising the steps of generating an interrogating beam of source neutrons, irradiating a sample area of the rod with the source neutrons to fission neutrons in groups of three or more neutrons or fission induced gammas per fission event, and counting groups of three of the fission neutrons or gammas with said detectors in coincidence to discriminate against the source neutrons and Compton scattering and to provide accurate spatial definition of the sample area along the axis of the rod.

4. Apparatus for the non-destructive assay of a nuclear fuel sample including the combination of a source of interrogating neutrons for generating neutrons one at a time, means to position the sample in the path of source neutrons whereby fission events in the fissile elements in the sample radiate fission neutrons or neutron induced gammas in groups of three or more neutrons or gammas per fission event, means to detect the simultaneous radiation of said three or more neutrons or gammas for each fission event, and means to count the detected coincident neutrons or gammas.

5. The invention of claim 4 in which a body of neutron moderating material is interposed between the neutron source and the fuel sample.

6. The invention of claim 4 in which a body of neutron scattering material is interposed between the source of interrogating neutrons and the fuel sample.

7. The invention of claim 4 in which the means to detect the neutrons or gammas includes at least three radiation detectors positioned to receive the fission neutrons or gammas from the fuel sample, each of the detectors detecting at least one of the neutrons or gammas from each fission event, and the counting means includes counting circuit means to count the number of coincident detections of fission neutrons or gammas.

8. The invention of claim 7 in which each of the detectors comprise an organic scintillator.

9. The invention of claim 7 in which a body of Compton gamma shielding material is interposed between said radiation detectors.

10. The invention of claim 7 in which each of the detectors comprise a neutron sensitive proportional counter, together with a neutron moderating body surrounding the proportional counters.

11. The invention of claim 10 in which a body of gamma shielding material is interposed between the neutron source and the detectors.

12. The invention of claim 10 in which a body of gamma shielding material is interposed between the detectors and the sample.

13. A method for determining the respective proportions of at least two fissile materials in a fuel element or other mixture of fissile materials comprising the steps of irradiating the fuel element or other mixture of fissile material with source neutrons to fission the fissile elements in the sample for emission of fission neutrons singly and in groups of two or more neutrons, counting the emitted groups of neutrons in coincidence at at least two levels of coincidence, and comparing the measured count rates for the at least two levels of coincidence with standard count rates for those two levels of coincidence for mixtures containing known proportions of fissile materials to establish the proportions of the at least two fissile materials in the fuel element or other mixture of fissile materials.

14. A method in accordance with claim 13 wherein the fissile elements in the sample also emit gammas singly and in groups of two or more and including the step of counting the emitted gammas as well as neutrons for at least two levels of coincidence.

15. A method for measuring the respective proportions of a neutron emitting material mixed with a fissile material in a sample comprising the steps of measuring the proportions of fissile material content as in claim 13 and including the steps of counting spontaneous neutron emission rates of the sample at at least two coincidence levels, and comparing the measured count rates for the at least two levels of coincidence with standard count rates for those two levels of coincidence for mixtures containing known proportions of neutron-emitting materials to establish the proportions of various spontaneous neutron-emitting isotopes in the sample.

* * * * *